United States Patent Office 3,218,353
Patented Nov. 16, 1965

3,218,353
PROCESS FOR PREPARING 1,2,3,4-BUTANETETRA-CARBOXYLIC ACID AND 1,2,3,4-CYCLOPENTANETETRACARBOXYLIC ACID
Ross Van Volkenburgh, Baton Rouge, and Jerome R. Olechowski, Lake Charles, La., assignors to Copolymer Rubber & Chemical Corporation, a corporation of Louisiana
No Drawing. Filed June 19, 1962, Ser. No. 203,433
21 Claims. (Cl. 260—514)

This invention broadly relates to the preparation of oxygen-containing organic compounds from olefins and, in some of its more specific aspects, to novel ozonides and an improved process for their preparation. The invention further relates to the preparation of tetracarboxylic acids and their derivatives from the ozonides described herein and to a polymerization process in which the ozonides of the invention are used as a catalyst.

It is known that ozone will react with olefins to produce ozonides which range from compounds having a relatively simple structure to compounds which have a very complex structure. Some of the more complex ozonides may be polymeric in nature or they may contain products produced upon decomposition of the initial ozonide and, as a result, their exact structure is difficult to ascertain with certainty. In view of the uncertainty of the nature of the recoverable products of an ozonolysis, the term "ozonide" may be used in the specification and claims to refer to the products produced upon reaction of the defined olefins and ozone under the recited conditions. The reaction products may or may not have the structure usually assigned to a simple ozonide or a polymer thereof, and in some instances the recoverable products may be decomposition products or derivatives of an intermediate simple ozonide or its polymers.

It is also known that certain ozonides may be decomposed oxidatively to produce carboxylic acids. In instances where a cyclic olefin is ozonized, oxidative decomposition of the resultant ozonide should produce a dicarboxylic acid useful in the preparation of polyamides, polyesters, synthetic lubricants, etc. Thus, from a theoretical standpoint ozonolysis of a selected olefin followed by oxidative decomposition of the ozonide should be a highly satisfactory and economic commercial process for producing desired carboxylic acids.

In most instances ozonides are highly unstable and are subject to violent explosion. An explosion may be initiated by shock or thermally upon heating to relatively low temperatures, and often an explosion occurs for no apparent reason. Thus the handling and storing of ozonides in appreciable quantities usually is considered to be a hazardous undertaking. Due in part to the dangerous and often unpredictable behavior of ozonides, the preparation of polycarboxylic acids by ozonolysis of cyclic olefins to produce the corresponding ozonide, followed by oxidative decomposition to produce the desired polycarboxylic acid, has not met with general acceptance and other methods of oxidation are usually employed. Also, the yield of the desired polycarboxylic acid upon decomposition of the ozonide by prior art processes often is low or large quantities of expensive oxidant are required and the process is rendered unattractive from an economic standpoint.

The surprising discovery has been made that the class of cyclic olefins defined herein may be reacted with ozone to produce the corresponding ozonides in quantitative or substantially quantitative yield, and that the resultant ozonide products are stable at normal room temperature and do not decompose explosively when subjected to shock or impact. Thus, the ozonide products of the invention may be handled or stored without undue danger of explosion thereby overcoming one important disadvantage of the prior art processes for the preparation of dicarboxylic acids by ozonolysis of cyclic olefins. The further surprising discovery has been made that the stable ozonides or reaction products of the invention may be decomposed oxidatively to produce the desired polycarboxylic acid or its derivatives in high yield and that an inexpensive elemental oxygen-containing gas is an excellent oxidant. It has been further discovered that derivatives such as monoesters may be prepared in the solvent used in the ozonolysis to thereby produce derivatives of tetracarboxylic acids in high yield and at low cost. It has been further discovered unexpectedly that the ozonide products of the invention are excellent catalysts for the polymerization of polymerizable ethylenically unsaturated organic compounds. In view of the above and other features and advantages, the invention provides for the first time an entirely satisfactory process for preparing tetracarboxylic acids by ozonolysis of cyclic olefins.

It is an object of the present invention to provide novel ozonides of the ethylenically unsaturated compounds defined herein and compositions of matter comprising the ozonides.

It is a further object of the invention to provide a process for ozonizing the ethylenically unsaturated compounds defined herein and to provide the resultant reaction product.

It is still a further object of the invention to provide a novel process for oxidatively decomposing the ozonides and/or reaction products mentioned herein to produce tetracarboxylic acids or other useful oxygen-containing compounds.

It is still a further object of the invention to prepare tetracarboxylic acids and derivatives thereof by steps including reacting the ethylenically unsaturated compounds defined herein with ozone in an organic solvent and then oxidatively decomposing the resultant reaction product.

It is still a further object of the invention to provide a novel catalyst and process for the polymerization of polymerizable materials.

Still other objects and advantages of the invention will be apparent to those skilled in the art upon reference to the following detailed description and the examples.

It has been discovered that a compound having the structure of a Diels-Alder adduct selected from the group consisting of:

(A) Diels-Alder adducts of a diene having the general formula (I) 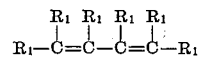

and a dienophile selected from the group consisting of monoethylenically unsaturated dicarboxylic acids having the general formula (II) 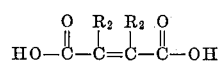

and anhydrides, salts and esters thereof, where $R_1$ and $R_2$ are selected from the group consisting of hydrogen, monovalent radicals and mixtures thereof; and (B) Diels-Alder adducts of a diene having the general formula (III) 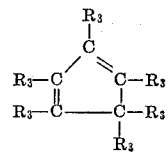

and a dieneophile selected from the group consisting of monoethylenically unsaturated dicarboxylic acids having the genreal formula (IV) 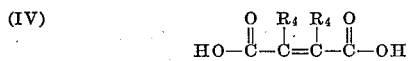

and salts and esters thereof, where $R_3$ and $R_4$ are selected from the group consisting of hydrogen, monovalent radicals and mixtures thereof, may be ozonized to produce novel ozonides having many highly unusual and unexpected properties.

The cyclic olefin preferably is dissolved in an ozone-inert organic solvent and then a stream of ozone-containing gas is passed therein until the desired amount of ozone has been absorbed. Examples of ozone-inert solvents include halogenated hydrocarbons and especially chlorinated or fluorinated hydrocarbons containing 1 through 8 and preferably 1–4 or 1–2 carbon atoms, aliphatic carboxylic acids containing 1–18 carbon atoms and preferably 2 through 4 carbon atoms, a wide variety of ozone-inert hydrocarbons including acyclic and cyclic saturated hydrocarbons containing 1–20 carbon atoms, alcohols containing 1 through 12 carbon atoms and preferably 1 through 2 carbon atoms, and esters resulting from the reaction of the foregoing carboxylic acids and alcohols, and preferably esters prepared from alcohols and carboxylic acids containing 1 through 4 carbon atoms. Still other organic solvents may be used such as those known to be satisfactory solvents for the ozonolysis of olefins. It is understood that the selected solvent is liquid under the temperature and pressure conditions of the ozonolysis and/or the decomposition of the ozonide.

The ozone-containing gaseous stream may be passed into the olefin solution at a convenient temperature for ozonolysis such as from about $-75°$ C. to about $+90°$ C., and preferably from about $-30°$ C. to about $+30°$ C. In some instances, a temperature of about $0-10°$ C. gives superior results.

The ozone may be present in any suitable diluent gas which does not adversely affect the reaction such as air or oxygen. For instance, the ozone may be prepared by passing air or oxygen through an ozone generator of a type that is commercially available to provide an ozone content in the effluent stream of 2–5% by volume. The concentraiton of ozone in the resultant ozone-containing air or oxygen stream is not critical and may vary over wide ranges. In instances where the gaseous stream has a low ozone content, it is passed through the solution of olefin in greater volume or for a longer period of time so as to assure the absorption of the desired molar quantity of ozone. In instances where higher concentrations of ozone are present, then smaller volumes of the gaseous stream may be passed through the solution. Usually the ozone stream is passed through the solution until the amount of ozone absorbed is sufficient to react with substantially all of the double bonds in the olefin content but where desired smaller or larger amounts may be used. No immediate adverse effects are noted when excess ozone is passed through the solution but it is an economic waste.

The novel ozonide present in the ozonized reaction mixture may be recovered by evaporation of solvent, preferably under reduced pressure or at normal room temperature by means of a rotary evaporator, or in some instances by precipitation with suitable precipitating agents such as ligroin. The resultant ozonide is stable at normal room temperature and it is insensitive to shock as tested by impact with a hammer or other device. The ozonide may be handled and stored without danger of explosion and it burns in an open flame without explosion.

Ozonides prepared in accordance with the invention are effective catalysts for the polymerization of the ethylenically unsaturated monomers and especially in emulsion polymerization systems at temperatures of 60° C. or higher. Examples of materials which may be polymerized using the ozonides as catalysts include the various 1,3-butadienes such as 1,3-butadiene, methyl-2-butadiene-1,3, piperylene, and 2,3-dimethyl-butadiene-1,3. If desired, the material to be polymerized may be a mixture of a 1,3-butadiene, and another polymerizable compound which is capable of forming copolymers therewith. For instance, polymerizable mixtures may contain up to 50% or higher by weight of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadiene are the aryl olefins such as styrene and vinyl naphthalene; the alpha methylene carboxylic acids and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The preferred polymerizable material often is a mixture of butadiene and styrene wherein the styrene content of the mixture is up to 50% by weight. If desired, conventional recipes for the preparation of SBR latices may be used, such as those employed in "cold rubber" polymerization processes.

Ozonides prepared in accordance with the invention are useful as intermediates in the preparation of oxygen-containing compounds such as tetracarboxylic acids and, when used for this purpose they may be employed with or without recovery from the ozonized reaction mixture. For example, the substantially pure ozonide may be recovered from the reaction mixture and decomposed oxidatively to produce the tetracarboxylic acid. However, usually it is preferred that the ozonide be decomposed oxidatively without recovery from the reaction mixture since better yields may be obtained and processing steps are eliminated.

Any suitable process may be used for oxidatively decomposing the ozonides and satisfactory oxidizing agents include hydrogen peroxide and peracids such as performic acid and peracetic acid. Surprisingly, elemental oxygen-containing gas is one of the best oxidizing agents as well as offering very substantial economic advantages. The ability of the ozonides to be oxidatively decomposed to the tetraacid in high yield in the ozonolysis reaction mixture and with relatively inexpensive elemental oxygen-containing gas as the oxidant is unexpected and renders the over-all process very attractve from an economic standpoint. In instances where hydrogen peroxide or a peracid is used as the oxidant, the ozonide may be decomposed at a prior art temperature such as the reflux temperature of the system. Usually, an excess of the peracid or hydrogen peroxide is used and the excess decomposed by continued reflux.

In instances where an elemental oxygen-containing gas is used in oxidatively decomposing the ozonide, the ozonide is dissolved in an inert solvent, which may be the ozonized reaction mixture, and then an elemental oxygen-containing gas such as pure oxygen or air is passed through the solution while maintaining the temperature sufficiently elevated to assure a satisfactory decomposition rate. A wide temperature range may be used but usually it is prefered that the temperature be from normal room temperature up to the reflux temperature of the solvent under the existing pressure. Often better results may be obtained at temperatures of about 75–200° C., or higher and preferably about 90–150° C. In many instances, best results are obtained at about 95–110° C. The elemental oxygen-containing gas may be air, pure oxygen, air enriched with oxygen or mixtures of pure oxygen with an inert diluent gas such as nitrogen, helium, argon, etc. Preferably, the elemental oxygen-content is 5–20% or higher. The elemental oxygen-containing gas is passed through the solution until the oxygen contained in peroxide linkages of the ozonized olefin is about 10% by weight or less.

Oxidative decomposition of the ozonide as described above results in a compound having oxygen attached directly to the two carbon atoms at the site of the ozonide linkage or the original double bond of the olefin. The compound may be recovered by removal of the solvent by distillation or other satisfactory method.

The solvent for the ozonolysis step is inert with respect to ozone. The solvent may or may not be inert with respect to the cyclic olefin to be ozonized and/or the ozonide or its decomposition products, and when desired the solvent may be active to thereby produce derivatives directly. Examples of solvents which may be active with respect to the olefin, ozonide or its decomposition products include alcohols, carboxylic acids, and water, and examples of inactive solvents include hydrocarbons, halogenated hydrocarbons and esters. Table I illustrates products which may be present in the ozonolysis reaction mixture when the Diels-Alder adduct of cyclopentadiene and maleic acid or maleic anhydride is ozonized in various solvents or solvent mixtures.

TABLE I

| Compound Ozonized | Solvent | Product |
|---|---|---|
| The Diels-Alder adduct of cyclopentadiene and maleic anhydride. | Anhydrous inactive solvent (esters, etc.). | (V) |
| Do | Anhydrous carboxylic acids ($R-\overset{O}{\underset{\|}{C}}-OH$) | (VI) + isomers |
| Do | Anhydrous alcohols ($R_1-OH$) | (VII) + isomers |
| Do | Aqueous carboxylic acids ($R_2-\overset{O}{\underset{\|}{C}}-OH$) | (VIII) |
| The Diels-Alder adduct of cyclopentadiene and maleic acid. | Anhydrous inactive solvent (esters, etc.). | (IX) |
| Do | Anhydrous or aqueous carboxylic acids ($R_3-\overset{O}{\underset{\|}{C}}-OH$) | (X) |
| Do | Anhydrous alcohols ($R_4-OH$) | (XI) |

Products analogous to the above may be obtained by substituting other cyclic olefins as defined herein for the olefin to be ozonized. Anhydrous oxidation of compounds V and VI produces the 2,3-monoanhydride of 1,2,3,4-cyclopentanetracarboxylic acid which is not as desirable for some purposes as the 1,2-anhydride. Since the 2,3-monoanhydride upon further dehydration produces the 1,4,2,3-dianhydride, it is usually preferred that the 2,3-anhydride linkage be hydrolyzed and then the resultant 1,2,3,4-cyclopentanetetracarboxylic acid is dehydrated to produce 1,2,3,4-cyclopentanetetracarboxylic acid dianhydride. Oxidative decomposition in the presence of water of compounds V, VI, VIII, IX and X produces 1,2,3,4-cyclopentanetetracarboxylic acid, and oxidative decomposition of VII produces the monoester of cyclopentanetetracarboxylic acid. Thus, the present invention offers a unique, highly efficient method for the preparation of monoesters of 1,2,3,4-cyclopentanetetracarboxylic acid.

In instances where lactone formation is a problem, often better results may be obtained when the free carboxylic acid groups are reacted. Fox example, it may be preferred to ozonize the olefin in an anhydrous solvent using an adduct prepared from the anhydride or ester form of the dicarboxylic acid dienophile and then reduce lactone formation by decomposing the resultant ozonide under conditions whereby the anhydride or ester linkage is not hydrolyzed. Thereafter, the anhydride or ester linkage may be hydrolyzed and the free tetraacid obtained when desired.

In instances where the free tetraacid or the anhydride is prepared, it is usually preferred that the solvent for the ozonolysis step and/or the ozonide decomposition step be acetic acid. The acetic acid may or may not contain water depending upon the results desired. In instances where water is present, the acetic acid may contain by volume up to 50–60% water, but preferably about 25% or less.

Where it is desired to prepare the corresponding anhydride derivatives of the tetraacids, this may be accomplished by prior art methods including reaction with excess acetic anhydride at an elevated temperature such as 125° C. for 1–3 hours and dehydration under reduced pressure. The present invention provides an efficient, inexpensive process for the preparation of tetracarboxylic acids and their anhydrides.

The Diels-Alder adducts useful in practicing the invention may be prepared by conventional practices well known to the art. The dienes useful in preparing the Diels-Alder adduct embrace those selected from the group consisting of

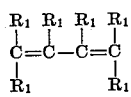

and

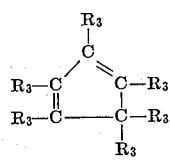

wherein $R_1$ and $R_3$ are hydrogen, suitable monovalent substituents and mixtures thereof. While a wide variety of suitable monovalent radicals are known to the art and may be present, certain exemplary ones include alkyl, cycloalkyl or alkyl substituted cycloalkyl, aryl and alkylaryl groups containing 1–20 and preferably 1–8 or 1–4 carbon atoms, halogen and espectially chlorine which may impart fire resistance or other desirable properties. Specific examples of suitable dienes include butadiene, isoprene, piperylene, cyclopentadiene, and alkylcyclopentadienes wherein the alkyl groups contain 1–8 and preferably 1–4 carbon atoms, including methylcyclopentadiene, ethylcyclopentadiene, dimethylcyclopentadiene and methylethylcyclopentadiene.

The dienophiles which may be used in preparing the Diels-Alder adduct embrace those selected from the group consisting of monoethylenically unsaturated dicarboxylic acids having the formula

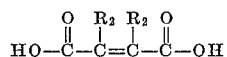

and anhydrides, salts and esters thereof. Esters of the dicarboxylic acid may be prepared from suitable alcohols such as alcohols containing 1–20 and preferably 1–8 or 1–4 carbon atoms. In general, $R_2$ may be any suitable substituent which allows preparation of satisfactory Diels-Alder adducts for use in the invention and may embrace the substituents described above for $R_1$ and $R_3$. Specific examples of monoethylenically unsaturated dicarboxylic acids satisfactory for practicing the invention include fumaric acid and maleic acid, and their ester, anhydride and chloro- or dichloro-derivatives.

Preferred results are obtained when $R_1$ and $R_2$ are certain substituents, and especially when a desired end product is to be produced. For example, when preparing a tetracarboxylic acid it is desirable that $R_1$ and $R_2$ be hydrogen for carbon atoms joined by the double bond in the resultant adduct since the tetracarboxylic acid is produced upon oxidative cleavage of the double bond between the carbon atoms to which the hydrogen is attached. However, in instances where $R_1$ and $R_3$ attached to the two carbon atoms at the site of the double bond in the adduct are alkyl or cycloalkyl, it is possible to form a keto acid or diketo acid which upon further oxidation produces the tetracarboxylic acid.

Ozonides prepared from Diels-Alder adducts having the following structural formulae may be used as catalysts or for other purposes as defined herein:

(XII)

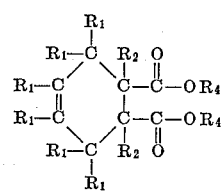

(XIII)

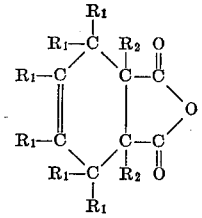

(XIV)

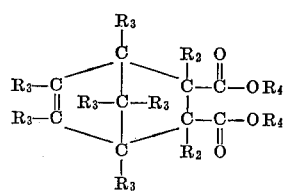

XV)

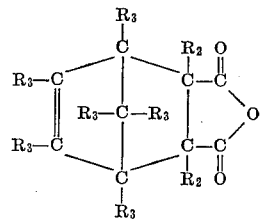

wherein $R_1$, $R_2$ and $R_3$ are substituents as discussed above for the dienes and dieneophiles and $R_4$ is hydrogen or a residue derived, for example, by reacting an alcohol containing 1–20 and preferably 1–8, or 1–4 carbon atoms with the dibasic acid. Such compounds may be conveniently prepared by subjecting the dienes and dieneophiles mentioned herein to a Diels-Alder reaction but other methods of preparation may be used. The carbon-carbon double bond in each formula is attacked upon ozonization in accordance with the invention thereby resulting at least initially in the formation of an ozonide linkage between the two carbon atoms. When it is desired to prepare a tetracarboxylic acid preferably only hydrogen atoms are attached to the carbon atoms at the site of the double bond and the ozonide linkage is cleaved oxidatively to form two carboxylic groups. When organic radicals are present on the carbon atoms, the keto-groups formed initially may be further oxidized to form carboxylic groups. The ester or anhydride linkages when present may be hydrolyzed to form two additional free carboxylic groups and thus result in preparation of the desired tetracarboxylic acid.

The foregoing detailed description and the following specific examples are for purposes of illustration only, and are not intended as being limiting to the spirit or scope of the appended claims.

*Example I*

This example illustrates the ozonolysis of the Diels-Alder adduct of cyclopentadiene and maleic anhydride (bicyclo[2.2.1]-hept-5-ene-2,3-dicarboxylic anhydride) in ethyl acetate as a solvent.

A solution of 8.2 grams of the above adduct dissolved in 100 ml. of ethyl acetate was cooled to a temperature of 5° C. Then, a gaseous mixture of oxygen and ozone containing about 4 mol percent of ozone was passed through the resultant solution at a rate of about 0.18 mol of ozone per hour until 1 mol of ozone per mol of the adduct had been absorbed. At that time, the resultant ozonide had partially crystallized out and a quantitative yield was obtained upon removal of the ethyl acetate solvent at reduced pressure.

The ozonide precipitate was subjected to an impact sensitivity test and was found to be insensitive to shock or impact. It gave a positive test for active oxygen as determined by the potassium iodine test, and it was converted to a gummy, slightly discolored residue upon exposure to the atmosphere for an appreciable period of time.

The freshly prepared ozonide precipitate contained about 1.8% active oxygen, as compared with a theoretical-active oxygen content of 7.55% for monomeric $C_9H_8O_6$. The ozonide had a melting point of 135–138° C. with decomposition, and it was insoluble in water, benzene, dioxane, lower alcohols and organic solvents in general. The neutralization equivalent was 88.

The above prepared ozonide product may be a polymeric cyclic ozonide containing 4 cyclopentane rings and may have the following repeating structure:

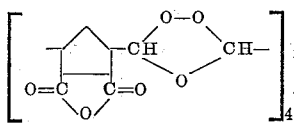

It is understood that the terminal valences of the above repeating structure are joined to complete the structure for the cyclic polymeric ozonide.

*Example II*

Example I was repeated with the exception of substituting methanol as a solvent for the ethyl acetate solvent of Example I.

A quantitative yield of a mixture of products of ozonolysis was obtained which was mildly reactive toward lead tetraacetate and soluble in alcohol but insolube in water, benzene and dioxane. The neutralization equivalent was 196.5 and the active oxygen content varied between 4.8 and 5.8%, as compared with a calculated active oxygen content of 5.8% for the formulae appearing below.

The ozonide products obtained following the procedure of this example may be a mixture of peroxides, hydroperoxides and hemiperacetals containing a cyclopentane ring of the types:

(XVI)
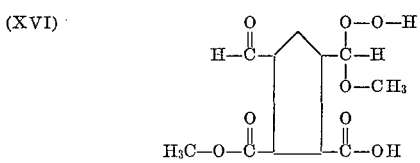

(XVII)
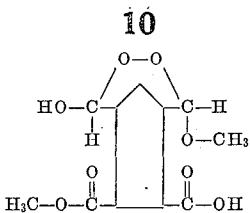

(XVIII)
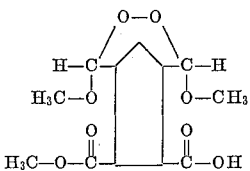

*Example III*

The procedure of Example I was repeated with the exception of substituting aqueous acetic acid containing 75% by volume acetic acid for the ethyl acetate solvent of Example I.

The resultant product of ozonolysis was obtained in 97% yield. The melting point was 150–153° C. with decomposition, the neutralization equivalent was 109.7, and it was slightly soluble in lower alcohols and dioxane, and insoluble in water and benzene. The active oxygen content was about 4.5%, as compared with a calculated active oxygen content of 5.5% for $C_{11}H_{14}O_9$.

The product of ozonolysis may have the following formula:

(XIX)
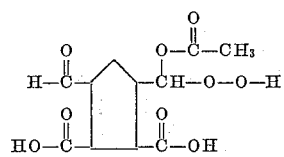

*Example IV*

A solution of 0.5 mol. of Diels-Alder adduct of cyclopentadiene and maleic acid (bicyclo[2.2.1]hept-5-ene-2,3-dicarboxylic acid) in one liter of methanol was prepared and cooled to 7–10° C. Then, a mixture of oxygen and ozone containing about 4 mol percent of ozone was passed through the solution at the rate of 0.18 mol of ozone per hour until the reaction mixture had been treated with slightly more than 1 mol of ozone per mol of the dicarboxylic acid. The temperature of the solution was maintained at 7–10° C. during the ozonolysis.

The methanol solvent was removed under reduced pressure to thereby obtain the ozonide in substantially quantitative yield. The ozonide contained about 5.3% active oxygen, the neutralization equivalent was 103 and a lead tetraacetate test was negative. The product may have the following structure:

(XX)
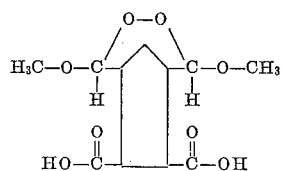

*Example V*

The procedure of Example IV was repeated with the exception of substituting ethyl acetate as a solvent for the methanol solvent of Example IV, and using a concentration of 0.25 mol of the dicarboxylic acid per liter of solvent.

The resultant ozonide had an active oxygen content of 6.26, a neutralization equivalent of 101 and exhibited a negative lead tetraacetate test. The structure of the ozonide may be as follows:

(XXI)
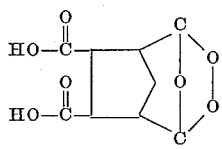

Example VI

The procedure of Example IV was repeated with the exception of substituting glacial acetic acid as a solvent for the methanol solvent of Example IV and using a concentration of 0.25 mol of the dicarboxylic acid per mol of solvent.

The resultant product of ozonolysis had an active oxygen content of 2.9%, a neutralization equivalent of 84.5 and molecular weight of 177. It exhibited a negative lead tetraacetate test.

Example VII

A solution of 16.4 grams of bicylo [2.2.1]hept-5-ene-2,3-dicarboxylic anhydride in 200 mls. of glacial acetic acid was prepared and the resultant solution cooled to 5° C. Then, a mixture of oxygen and ozone containing about 4 mol percent of ozone was passed through the solution until 1 mol of ozone per mol of anhydride was absorbed. The ozonized solution was then treated with 15 ml. of 50% hydrogen peroxide solution and 5 drops of concentrated sulfuric acid, folowed by refluxing to effect oxidative decomposition of the intermediate ozonide. Upon cooling the resultant reaction mixture, cis,cis,cis,cis-1,2,3,4-cyclopentanetetracarboxylic acid was obtained having a melting point of 190–191° C. and a neutralization equivalent of 63.1. Upon analysis, the carbon content was 44.14 and the hydrogen content 4.35% (calculated: carbon, 43.91%; hydrogen, 4.09%).

A sample of the tetraacid prepared as above was converted to the dianhydride by refluxing with acetic anhydride. The resultant cis,cis,cis,cis-1,2,3,4-cyclopentanetetracarboxylic acid dianhydride had a melting point of 220–222° C. and upon analysis was found to contain 51.58% carbon, and 2.98% hydrogen (calculated: carbon, 51.9%; hydrogen, 2.9%).

Example VIII

This example illustrates the ozonolysis of bicyclo [2.2.1]-hept-5-ene-2,3-dicarboxylic anhydride in an ethyl acetate solvent, followed by oxidative decomposition of the ozonide with $HCOOH-H_2O_2$.

A solution containing 8.2 grams of the above anhydride in 50 ml. of ethyl acetate was prepared and treated with ozone containing 3–4 weight percent of ozone at a temperature of 0.5° C. After absorption of 1 molar equivalent of ozone (as shown by liberation of iodine from a potassium iodide trap), the solvent was removed by means of a rotary evaporator at room temperature to leave 9.5 grams of a white crystalline material. This material reacted with potassium iodide to liberate iodine.

The resultant product of ozonolysis was dissolved in 35 ml. of 90% formic acid and 6.8 grams (0.1 mol) of 50% hydrogen peroxide was added thereto. A strong exothermic reaction occurred, which caused the system to reflux without additional heat for at least 30 minutes. The mixture was then refluxed for an additional hour with application of heat to destroy the excess peroxide. Evaporation by means of a rotary evaporator at room temperature gave 9.5 grams of material which had a melting point of 185–187° C., and a neutralization equivalent of 109. (The calculated neutralization equivalent for the tetracarboxylic acid is 64.0 and for the lactone or dicarboxylic acid 108.)

Example IX

A solution of 0.1 mol of cis-$\Delta^4$-tetrahydrophthalic acid in 150 ml. of ethyl acetate was ozonized for 1 hour at a temperature of 30° C. The ozonolysis was effected by passing a mixture of ozone and oxygen containing about 4 mol percent ozone into the solution at the rate of 0.18 mol of ozone per hour until the calculated molar quantity of ozone was absorbed.

The solvent was removed upon completion of the ozonolysis by means of a rotary evaporator at room temperature to recover the product of ozonolysis. The product was decomposed by means of excess performic acid at reflux temperature, and evaporation of the solvent after destruction of the excess performic acid by reflux gave 0.041 mol of material having a melting point of 227–230° C. and a neutralization equivalent of 59.5. Analysis determined the carbon content to be 41.09% and the hydrogen content to be 4.4%.

The reported melting point for dl-1,2,3,4-butanetetracarboxylic acid is 235–236° C., the calculated neutralization equivalent is 58.5, the calculated carbon content is 41.0, and the calculated hydrogen content is 4.1%. Thus, the resultant product was dl-1,2,3,4-butanetetracarboxylic acid.

Example X

A solution of 0.1 mol of cis-$\Delta^4$-tetrahydrophthalic acid in 100 ml. of glacial acetic acid and 10 ml. of water was ozonized for 1 hour at a temperature of 30° C. The ozonolysis was effected by passing an oxygen-ozone stream having an oxygen content of about 4% by weight ozone into the solution at the rate of 0.18 mol of ozone per hour until the calculated quantity of ozone was absorbed.

The solution containing the product of ozonolysis was then heated to 90° C. and oxygen passed therein over a period of 5 hours at the rate of 0.03 cu. ft./min. at 8 p.s.i.g. Removal of the solvent gave 0.0835 mol of product having a melting point of 186–187° C. and a neutralization equivalent of 66.1. (Reported melting point for meso-1,2,3,4-butanetetracarboxylic acid is 189° C. and the calculated neutralization equivalent is 58.5.)

Treatment of tetraacid obtained above (0.05 mol) with an excess of methanol and in the presence of a catalytic amount of p-toluene sulfonic acid produced 0.0304 mol of the tetramethyl ester having a melting point of 70–72° C. The reported melting point for tetramethyl-1,2,3,4-butanetetracarboxylate is 73–74° C.

Example XI

This example illustrates the use of the product of ozonolysis of Example I as a polymerization catalyst.

A typical prior art SBR polymerization mixture containing by weight 70 parts butadiene, 30 parts styrene, 5 parts KOSR flakes, 0.3 part trisodium phosphate, 0.1 part sulfole and 180 parts of water was charged to 7 ounce experimental polymerization bottles. Then, the product of the ozonolysis of Example I was added to bottles 1, 2, and 3 in amounts of 0.04, 0.06 and 0.08 part, respectively. Upon raising the temperature to 60° C. and agitating, the polymerization was initiated and proceeded satisfactorily to produce an SBR polymer.

Example XII

The procedure of Example XI was repeated with the exception of using the product of ozonolysis of Example II as the polymerization catalyst. Upon raising the temperature of the reaction mixture to 60° C. with agitation, the polymerization was initiated and proceeded satisfactorily to produce an SBR polymer.

Example XIII

The procedure of Example I was followed to prepare an ethyl acetate solution of the ozonide of bicyclo[2.2.1]-hept-5-ene-2,3-dicarboxylic anhydride. Then, the solution was heated to 90° C. and molecular oxygen was bubbled through the solution to oxidatively decompose the ozonide. The molecular oxygen was bubbled into the solution until the active oxygen content of the ozonide was less than 10% by weight, and then the solvent was removed and the product recovered. The ozonide was cleaved to produce the dialdehyde derivative of the dicarboxylic acid (anhydride) at the point of the original double bond having a melting point of 262–3° C.

*Example XIV*

The general procedure of Example XIII was followed with the exception of substituting acetic acid for ethyl acetate as the solvent.

Oxidative cleavage of the ozonide with molecular oxygen in acetic acid solution produced the tetraacid, i.e., cyclopentanetetracarboxylic acid, rather than the dialdehyde derivative of Example XIII.

What is claimed is:

1. A process for preparing a tetracarboxylic acid selected from the group consisting of 1,2,3,4-butanetetracarboxylic acid and 1,2,3,4-cyclopentanetetracarboxylic acid comprising oxidatively cleaving by oxidizing with an elemental oxygen containing gas while in solution in an alkanoic carboxylic acid containing 1–18 carbon atoms, an ozonide of a compound selected from the group consisting of cis-$\Delta^4$-tetrahydrophthalic acid, cis-$\Delta^4$-tetrahydrophthalic anhydride, bicyclo[2.2.1]-hept-5-ene-2,3-dicarboxylic acid and bicyclo[2.2.1]-hept-5-ene-2,3-dicarboxylic anhydride, the ozonide of at least one of said cis-$\Delta^4$-tetrahydrophthalic acid and cis-$\Delta^4$-tetrahydrophthalic anhydride being oxidatively cleaved when preparing 1,2,3,4-butanetetracarboxylic acid, and the ozonide of at least one of said bicyclo[2.2.1]-hept-5-ene-2,3-dicarboxylic acid and bicyclo[2.2.1]-hept-5-ene-2,3-dicarboxylic anhydride being oxidatively cleaved when preparing 1,2,3,4-cyclopentanetetracarboxylic acid.

2. The process of claim 1 wherein the alkanoic carboxylic acid contains two through four carbon atoms.

3. The process of claim 1 wherein the alkanoic carboxylic acid is acetic acid.

4. The process of claim 1 wherein the elemental oxygen-containing gas is air.

5. The process of claim 1 wherein the said ozonide is prepared by reacting ozone with a compound selected from the group consisting of cis-$\Delta^4$-tetrahydrophthalic acid, cis-$\Delta^4$-tetrahydrophthalic anhydride, bicyclo[2.2.1]-hept-5-ene-2,3-dicarboxylic acid and bicyclo[2.2.1]-hept-5-ene-2,3-dicarboxylic anhydride, the compound and the ozone being reacted together in solution in an alkanoic carboxylic acid containing 1–18 carbon atoms at a reaction temperature between about —75° C. and about +90° C. and the resulting ozonide is oxidatively cleaved at a temperature of about 75–200° C.

6. The process of claim 5 wherein the alkanoic carboxylic acid contains two through four carbon atoms and the compound and the ozone are reacted together at a reaction temperature of about —30° to +30° C.

7. The process of claim 6 wherein the alkanoic carboxylic acid is acetic acid and the resulting ozonide is oxidatively cleaved at a temperature of about 95–110° C.

8. A process for preparing 1,2,3,4-cyclopentanetetracarboxylic acid comprising oxidatively cleaving the ozonide of bicyclo[2.2.1]-hept-5-ene-2,3-dicarboxylic acid, the ozonide being oxidatively cleaved by oxidation with an elemental oxygen containing gas while in solution in an alkanoic carboxylic acid containing 1–18 carbon atoms.

9. The process of claim 8 wherein the alkanoic carboxylic acid contains two through four carbon atoms.

10. The process of claim 8 wherein the alkanoic carboxylic acid is acetic acid.

11. The process of claim 8 wherein the elemental oxygen-containing gas is air.

12. The process of claim 8 wherein the ozonide is prepared by reacting ozone with bicyclo[2.2.1]-hept-5-ene-2,3-dicarboxylic acid in solution in an alkanoic carboxylic acid containing 1–18 carbon atoms at a reaction temperature between about —75° C. and about +90° C., and the resulting ozonide is oxidatively cleaved at a temperature of about +75–200° C.

13. The process of claim 12 wherein the alkanoic carboxylic acid contains two through four carbon atoms and the bicyclo[2.2.1]-hept-5-ene-2,3-dicarboxylic acid and the ozone are reacted together at a reaction temperature of about —30° C. to +30° C.

14. The process of claim 13 wherein the alkanoic carboxylic acid is acetic acid and the resulting ozonide is oxidatively cleaved at a temperature of about 95–110° C.

15. A process for preparing 1,2,3,4-cyclopentanetetracarboxylic acid comprising oxidatively cleaving the ozonide of bicyclo[2.2.1]-hept-5-ene-2,3-dicarboxylic anhydride, the ozonide being oxidatively cleaved by oxidation with an elemental oxygen containing gas while in solution in an alkanoic carboxylic acid containig 1–18 carbon atoms.

16. The process of claim 15 wherein the alkanoic carboxylic acid contains two through four carbon atoms.

17. The process of claim 15 wherein the alkanoic carboxylic acid is acetic acid.

18. The process of claim 15 wherein the elemental oxygen-containing gas is air.

19. The process of claim 15 wherein the ozonide is prepared by reacting ozone with bicyclo[2.2.1]-hept-5-ene-2,3-dicarboxylic anhydride in solution in an alkanoic carboxylic acid containing 1–18 carbon atoms at a reaction temperature between about —75° C. and about +90° C., and the resulting ozonide is oxidatively cleaved at a temperature of about +75–200° C.

20. The process of claim 19 wherein the alkanoic carboxylic acid contains two through four carbon atoms and the bicyclo[2.2.1]-hept-5-ene-2,3-dicarboxylic anhydride and the ozone are reacted together at a reaction temperature of about —30° C. to +30° C.

21. The process of claim 20 wherein the alkanoic carboxylic acid is acetic acid and the resulting ozonide is oxidatively cleaved at a temperature of about 95–110° C.

References Cited by the Examiner

UNITED STATES PATENTS

| | | | |
|---|---|---|---|
| 2,848,490 | 8/1958 | Friedrich et al. | 260—339 X |
| 2,850,523 | 9/1958 | Dazzi | 260—346.6 X |
| 2,872,438 | 2/1959 | Carroll et al. | 260—83.7 |
| 2,963,487 | 12/1960 | Perry | 260—339 |
| 3,023,233 | 2/1962 | Magglio et al. | 260—339 X |
| 3,072,621 | 1/1963 | Pampus et al. | 260—83.7 |
| 3,083,209 | 3/1963 | Habib et al. | 260—339 |
| 3,085,109 | 4/1963 | Lafont et al. | 260—514 |
| 3,094,556 | 6/1963 | Wiese et al. | 260—514 |

NICHOLAS S. RIZZO, *Primary Examiner.*

LEON J. BERCOVITZ, *Examiner.*

UNITED STATES PATENT OFFICE
CERTIFICATE OF CORRECTION

Patent No. 3,218,353                       November 16, 1965

Ross Van Volkenburgh et al.

It is hereby certified that error appears in the above numbered patent requiring correction and that the said Letters Patent should read as corrected below.

Column 2, line 47, for "Diels-Adler" read -- Diels-Alder column 4, line 49, for "attractve" read -- attractive --; lines 63 and 64, for "prefered" read -- preferred --; columns 5 and 6, formula VII should appear as shown below instead of as in the patent:

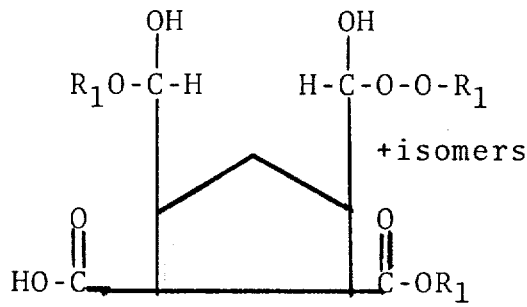

column 7, line 56, for "espectially" read -- especially --; column 10, line 42, for "of Diels-Alder" read -- of the Diels-Alder --; column 11, line 17, for "of84.5" read -- of 84. 5 --; line 18, for "and molecular" read -- and a molecular --; line 21, for bicylo" read -- bicyclo --.

Signed and sealed this 18th day of October 1966.

(SEAL)
Attest:

ERNEST W. SWIDER                          EDWARD J. BRENNER
Attesting Officer                      Commissioner of Patents